(12) United States Patent
Templeton

(10) Patent No.: US 6,301,780 B1
(45) Date of Patent: Oct. 16, 2001

(54) METHOD FOR RECORDING AN AVIATION OIL COOLER

(75) Inventor: Bryan K. Templeton, Wheeling, WV (US)

(73) Assignee: Positech International, Inc., Wheeling, WV (US)

(*) Notice: Subject to any disclaimer, the term of this patent is extended or adjusted under 35 U.S.C. 154(b) by 0 days.

(21) Appl. No.: 09/396,345

(22) Filed: Sep. 15, 1999

Related U.S. Application Data
(60) Provisional application No. 60/100,624, filed on Sep. 16, 1998.

(51) Int. Cl.[7] ........................................ B23P 15/00
(52) U.S. Cl. .................................. 29/890.031; 29/402.13
(58) Field of Search ........................ 29/890.031, 890.054, 29/402.08, 402.13, 426.4, 281.5; 269/40

(56) References Cited

U.S. PATENT DOCUMENTS

| | | | |
|---|---|---|---|
| 1,979,856 | * | 11/1934 | Bennett . |
| 3,289,268 | * | 12/1966 | Bernardis . |
| 4,769,888 | * | 9/1988 | Desiro ........................... 29/890.031 |
| 5,894,649 | * | 4/1999 | Lambert et al. . |

* cited by examiner

Primary Examiner—I Cuda Rosenbaum

(74) Attorney, Agent, or Firm—Steptoe & Johnson PLLC

(57) ABSTRACT

A process for recoring a damaged aviation oil cooler is disclosed wherein a damaged core is removed from an original aviation cooler and replaced with a new replacement core such that the reassembled aviation cooler maintains original equipment manufacturer (OEM) specifications. The processes comprises the steps of receiving an aviation oil cooler, pre-cleaning the aviation oil cooler, performing an initial inspection of the aviation oil cooler, disassembling the aviation oil cooler to remove an original damaged core from the aviation oil cooler, performing an intermediate inspection of the disassembled aviation oil cooler, reassembling the aviation oil cooler with a new replacement core, pressure testing the reassembled aviation oil cooler, and performing a final inspection of the reassembled aviation oil cooler to ensure correct OEM tolerances. The present invention further discloses the use of a reassembly jig to reassemble an aviation oil cooler with a new replacement core such that the reassembled aviation oil cooler maintains OEM specifications and tolerances. A reassembly jig of the present invention for recoring an aviation oil cooler has a support platform with a front face and a tank support bar, both having a plurality of holes, for mounting the tanks of an aviation oil cooler. The reassembly jig also incorporates a pair of core support bars for holding and maintaining a new replacement core in proper position, tolerance, and in alignment with the two tanks. Once the tanks and the new replacement core are correctly attached to the reassembly jig, these components are secured together such that the resulting aviation oil cooler meets all OEM specifications.

16 Claims, 7 Drawing Sheets

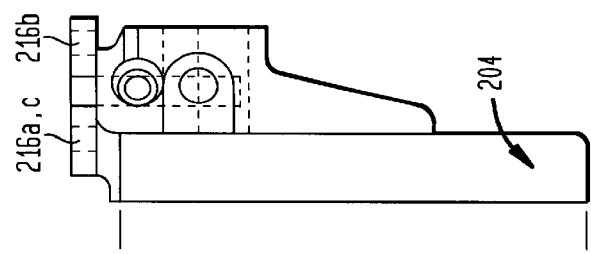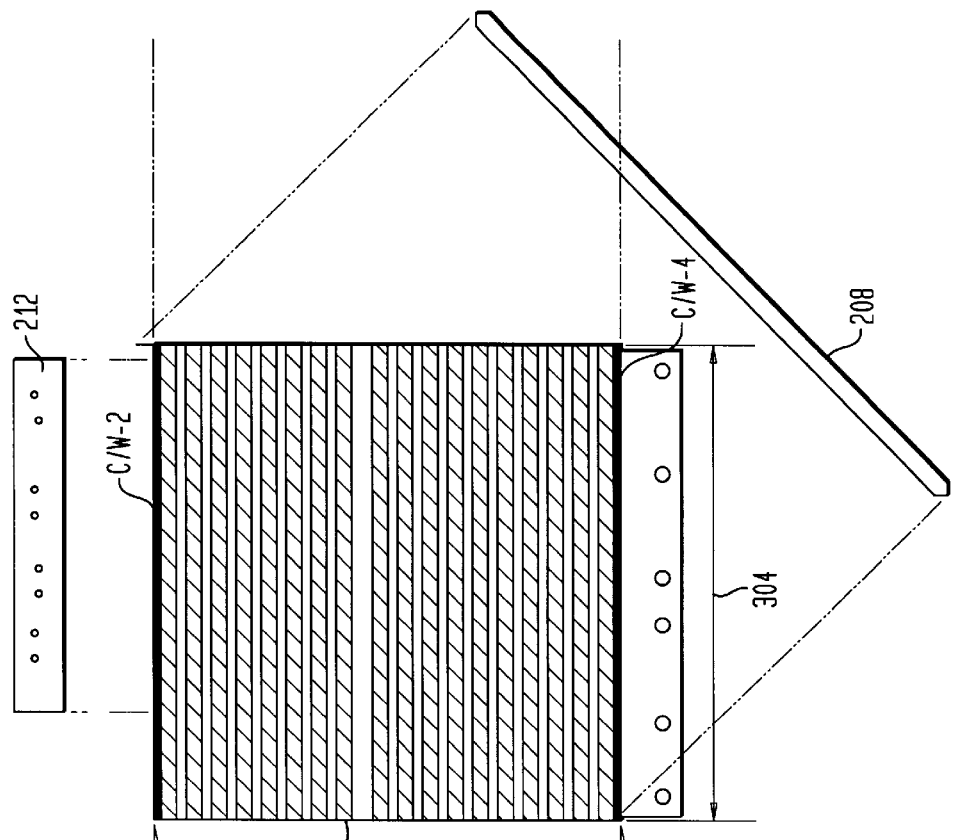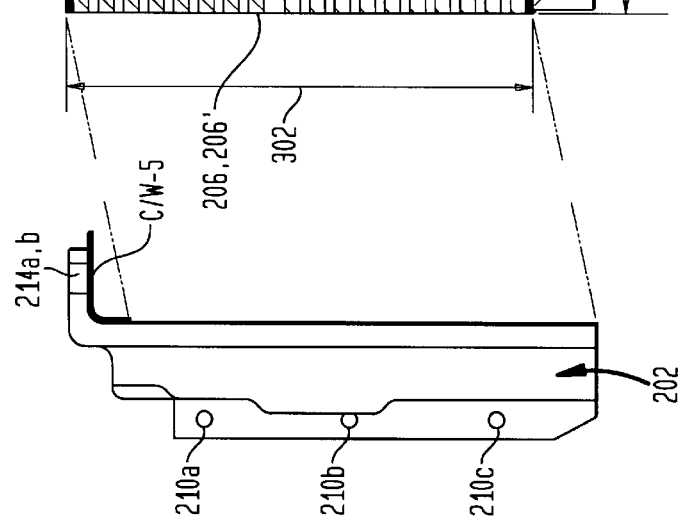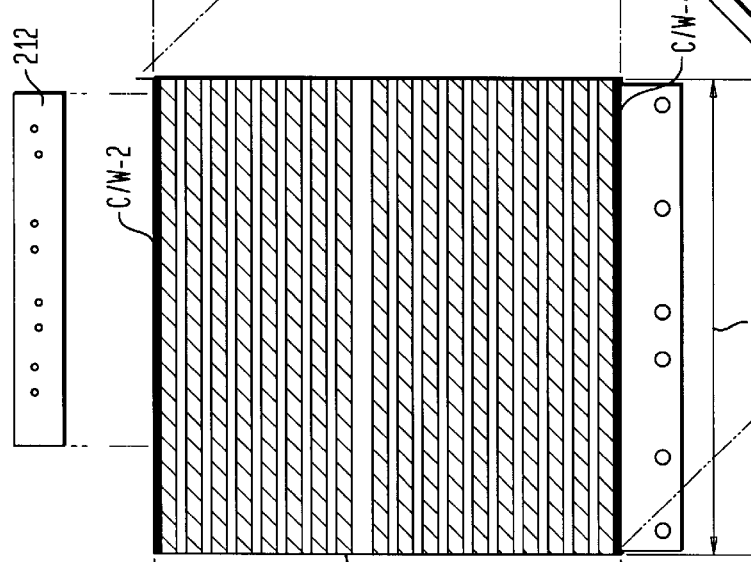

METHOD FOR RECORDING AN AVIATION OIL COOLER

CROSS-REFERENCE TO RELATED APPLICATIONS

This application claims the benefit of application Ser. No. 60/100,624, filed September 16, 1998.

BACKGROUND OF THE INVENTION

1. Field of Technology

The present invention relates to aviation oil coolers, and more specifically to the disassembly cleaning, recoring, and reassembly of an aviation oil cooler using a reassembly jig.

2. Related Art

The aircraft industry is composed of an aging fleet of aircraft many of which are no longer production. Therefore, parts for such aircraft are extremely difficult to acquire, if the parts car found at all, and in many situations, new replacement parts are non-existent. As a result, the aviation industry is now faced with repairing existing parts that have already been repaired a number of ti or scraping a part that is no longer repairable.

Oil coolers (e.g., oil hydraulic, air to oil, etc.) and other heat exchangers in the aging aviation fleet are constructed of a series of plates and fins that are stacked and vacuum braised into a solid unit called a "core". Aviation oil coolers and "core" components are well known in the relevant art and are commercially available. In most applications, the oil cooler must be exposed to a strong flow of air in order for it to perform the heat transfer for which it was designed. This strong air flow unfortunately promotes foreign object debris (FOD) to the unit over a period of time.

In the case of aviation oil coolers and other heat exchangers, today's method of repair is no different than it was twenty years ago. The conventional method for repairing cracks and holes in an aviation oil cooler or other heat exchanger and returning it to service comprises the steps of welding, braising, soldering, epoxy and blocking off a number of tubes to repair leaks. More specifically, the core of a damaged aviation oil cooler is repaired while remaining integrated with the original oil cooler unit. This method maintains the use of the original core in the original oil cooler such that the resulting repaired oil cooler is weaker and more prone to future damage than a new oil cooler having a new replacement core.

Therefore, there is a need for a method for recoring a conventional aviation oil cooler that removes the original damaged core from an existing aviation oil cooler, replaces it with a new replacement core, and returns the aviation oil cooler to its original equipment manufacturer (OEM) specifications.

In order to return a disassembled manufactured product to its OEM specifications, the individual components of the product must be held in proper position and alignment to each other during reassembly. However, there are no available "jigs," or structures. that function as a template for assembling a manufactured product. Therefore, there is a need for a reassembly jig for holding the components of an aviation oil cooler in their proper position during reassembly so as to maintain the OEM specifications for the reassembled aviation oil cooler.

SUMMARY OF THE INVENTION

Instead of attempting to repair the core of a damaged aviation oil cooler by trying to stop leaks in a twenty-plus year old core, the present invention repairs aviation oil coolers by replacing the entire original core with a newly constructed core, called a replacement core. In the preferred embodiment of the present invention, an original core is replaced by clean cutting the original core from an aviation oil cooler, removing the existing mounting brackets and hardware, and welding to the original aviation oil cooler a new replacement core having the same construction, dimensions, and functionality as the replaced original core and mounting hardware. All machining and welding are accomplished under guidelines outlined in the manual entitled FAA Repair Station #PC8R209J, and an additional welding certification is maintained under MIL-STD-1595A, entitled Aerospace Fusion Welding. These documents are publicly available government documents.

All exterior measurements and tolerances of the original aviation oil cooler and replacement core are maintained by using a special reassembly jig. Jigs are well known in the prior art and are used for other applications to facilitate the assembly of a mechanical unit by holding components of the mechanical unit in place and at specific tolerances during the unit's assembly. A reassembly jigs of the present invention is constructed of such dimensions and specifications such that a replacement core can be mounted in the original aviation oil cooler. The reassembly jig ensures the maintenance of close alignments and fits of the various components of the aviation oil cooler such that the finished repair of the aviation oil cooler meets the exact dimensions of the original equipment manufacturer (OEM) of the aviation oil cooler.

There are many advantages with replacing a damaged core in an aviation oil cooler with a new replacement core. For example, the cost of recoring an aviation oil cooler is much less than the cost. of a completely new aviation oil cooler. The life-span of an aviation cooler is prolonged, thereby saving repair and total replacement costs. Maintenance costs associated with an aviation oil cooler will be reduced.

DESCRIPTION OF THE FIGURES

The present invention is described with reference to the accompanying drawings. In the drawings, like reference numbers indicate identical or functionally similar elements. Additionally, the left-most digit(s) of a reference number identifies the drawings in which the reference number first appears.

FIGS. 3A–D: Planar exploded views of a side of the aviation oil cooler showing a first tank second tank and core of the oil cooler;

DETAILED DESCRIPTION OF THE PREFERRED EMBODIMENTS

A. Method for recoring an aviation oil cooler

Figure 1:
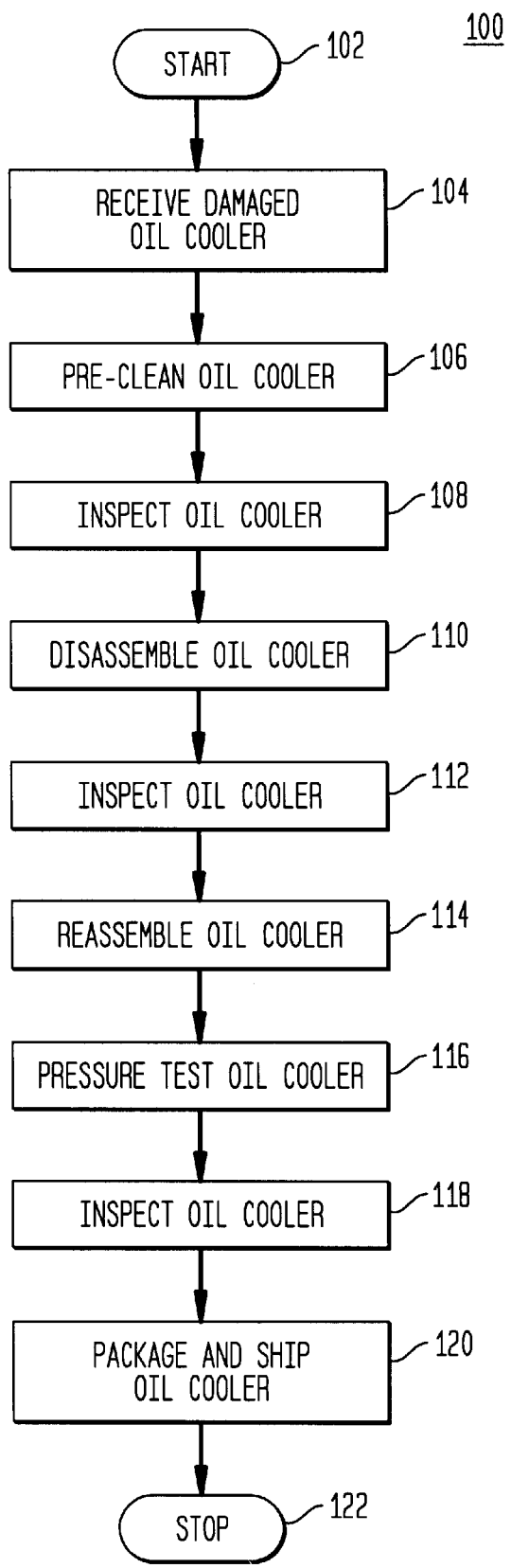
FIG. 1: A block diagram illustrating the operational steps for recoring an aviation oil cooler using a reassembly jig of the present invention.

FIG. 1 illustrates the operational steps for recoring 100 an aviation oil cooler of the present invention. These steps are discussed in relation to FIGS. 2–6 showing various views of a conventional aviation oil cooler 200 and cut/weld lines (C/W) for the disassembly and reassembly of the aviation oil cooler 200. The preferred embodiment of the present invention is for recoring the aviation oil cooler 200 for a Teledyne Continental, TSIO-520 engine. However, the recoring method of the present invention is described in these terms for convenience purpose only. It would be readily apparent to one of ordinary skill in the relevant art to use the present invention to recore any aviation oil cooler or other heat exchanger.

The recoring processing begins at step 102 and immediately proceeds to step 104. In step 104, a damaged aviation oil cooler 200 is received. Upon receipt, the damaged aviation oil cooler 200 is visually inspected to ensure all proper manufacturer identifications are present and that the aviation oil cooler's 200 corresponding original equipment manufacturer (OEM) number is eligible for receiving a replacement core. This identification information is transferred to a chemical proof tag and etched into the aviation oil cooler 200 so that all pertinent information does not come off or get destroyed during the recoring process. In addition, a customer identification number and a serial number is given to the aviation oil cooler 200 for tracking purposes. Other information stored for each aviation oil cooler 200 may include the OEM's name, part number, model and serial number, and type of aviation oil cooler 200. Step 104 is for convenience purpose only to facilitate the recoring process for a single aviation oil cooler and is therefore optional.

Once the damaged aviation oil cooler 200 is received and any initial processing complete, processing continues to step 106 wherein the aviation oil cooler 200 is pre-cleaned. In the preferred embodiment, pre-cleaning comprises pressure washing the aviation oil cooler 200 at 1300 to 1500 PSI for 30 minutes in an 180 degrees Fahrenheit bath containing a cleaning agent for metal (e.g., Hypersolve NPB by EcolLink for use with aluminum oil coolers), thereby soaking the aviation cooler 200 both inside and outside. The pre-cleaning makes the aviation oil cooler 200 clean enough to handle and to get a preliminary inspection for major external part failures. Pressure washing is well known in the relevant art and it would be readily apparent for one of ordinary skill in the relevant art to perform the pressure washing as described herein using conventional pressure washing methods In addition, the pressure washing of the present invention is described in these terms of PSI, time duration, temperature, and cleaning agent Hypersolve NPB for convenience purpose only. It would be readily apparent for one of ordinary skill in the art to wash an aviation oil cooler 200 using comparable measurements and cleaning agents to clean the aviation oil cooler 200 well enough for the following steps to be performed.

After pre-cleaning the aviation oil cooler 200, processing continues to step 108 for the first initial inspection of the aviation oil cooler 200. The aviation oil cooler 200 is visually inspected for excessive damage that might impair the performance and life span of the aviation oil cooler 200 Some examples of such excessive damage include, but are not limited to, (a) non-repairable damage or distortion to the value seat; (b) damaged threads in aluminum fittings, ports, drain bosses, or valve housing; and (c) damage to tank or valve bodies. Further, to ensure OEM tolerances, the aviation oil cooler 200 is pre-fitted in a reassembly jig 700 of the present invention. The reassembly jig 700 is described in greater detail below.

After the first inspection, processing continues to step 110 wherein the aviation oil cooler 200 is disassembled so as to detach the original damaged core 206 from the reusable portions of the aviation oil cooler 200. To maintain proper fit, form, and function, cuts are made along the OEM weld lines as shown in FIGS. 2–6 by the thick lining, having reference numbers starting with "C/W".

A conventional aviation oil cooler 200 comprises three principal parts: a first tank 200, a second tank 204, and a core 206. Other supporting components of a conventional aviation oil cooler 200 are a core support 208, a top plate 212 and a bottom plate 218. Upon cutting along the OEM lines, C/W-1 to C/W-6, of an aviation oil cooler 200, the aviation oil cooler 200 is separated into individual components. The cuts may be made in any order. Such cuts may be made using known techniques, e.g., with a plasma cutter or hacksaw, both of which are commercially available. It would be readily apparent to one of ordinary skill in the relevant art to cut an aviation oil cooler 200 along such cut-weld lines, C/W-1 to C/W-6, and separate the aviation oil cooler 200 into its components.

Once the aviation oil cooler 200 is disassembled, processing continues to step 112 for the second, or intermediate, inspection of the aviation oil cooler 200. During this inspection, all removed reusable parts of the aviation oil cooler 200 (e.g., first tank 202 and second tank 204) are de-burred and dressed for installation with a new replacement core 206'. The internal portions of all removed and reusable parts are visually inspected for any damages or imperfections, e.g., worn areas. The de-burring and dressing of such parts is well known in the prior art and would be readily apparent to one of ordinary skill in the relevant art. Any part found to be damaged or worn may be replaced by a new comparable part.

Figure 2:
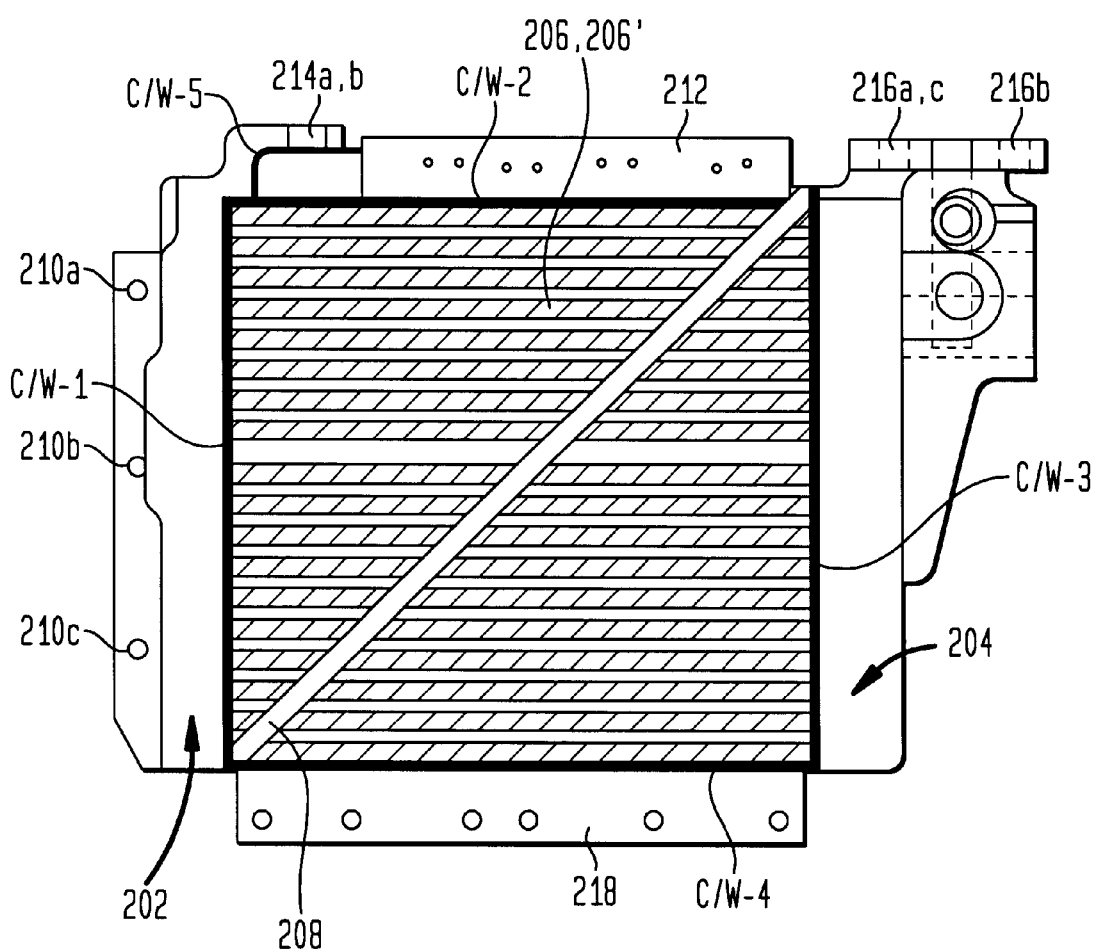
FIG. 2: Planar view of a conventional aviation oil cooler with a first tank, a second tank, and a core installed therein.
Figure 4:
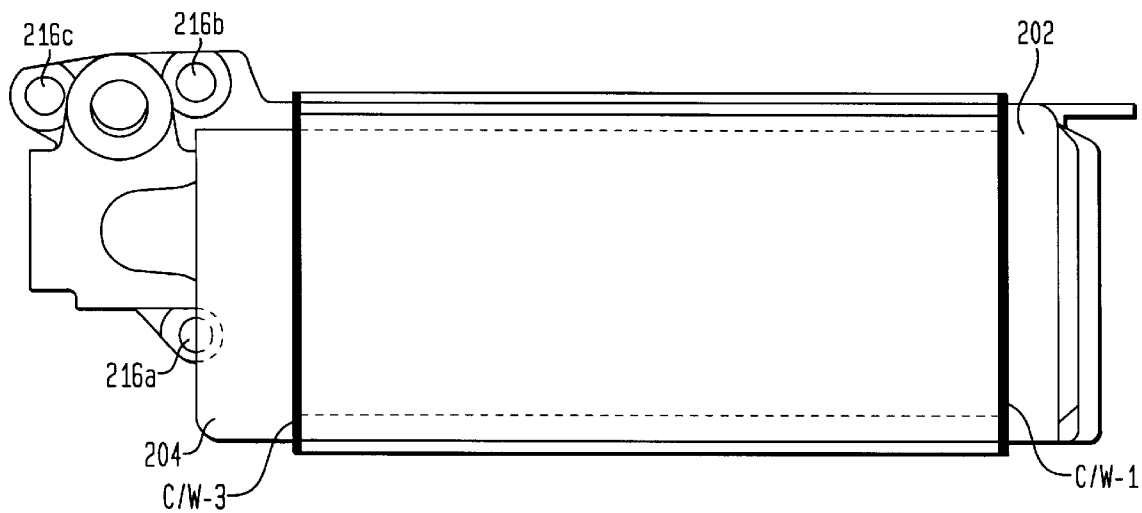
FIG. 4: Planar view of a bottom of the aviation oil cooler.
Figure 5:
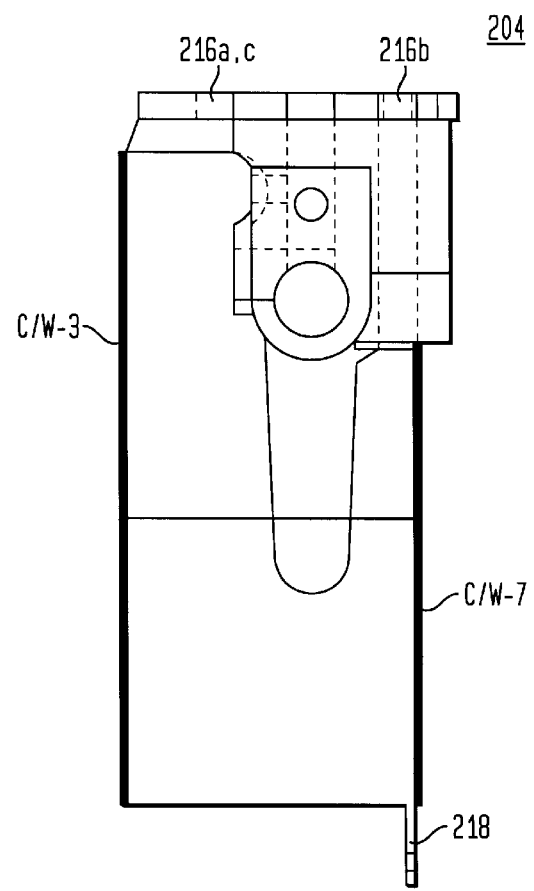
FIG. 5: Planar view of a side of the aviation oil cooler showing the side of the second tank.
Figure 6:
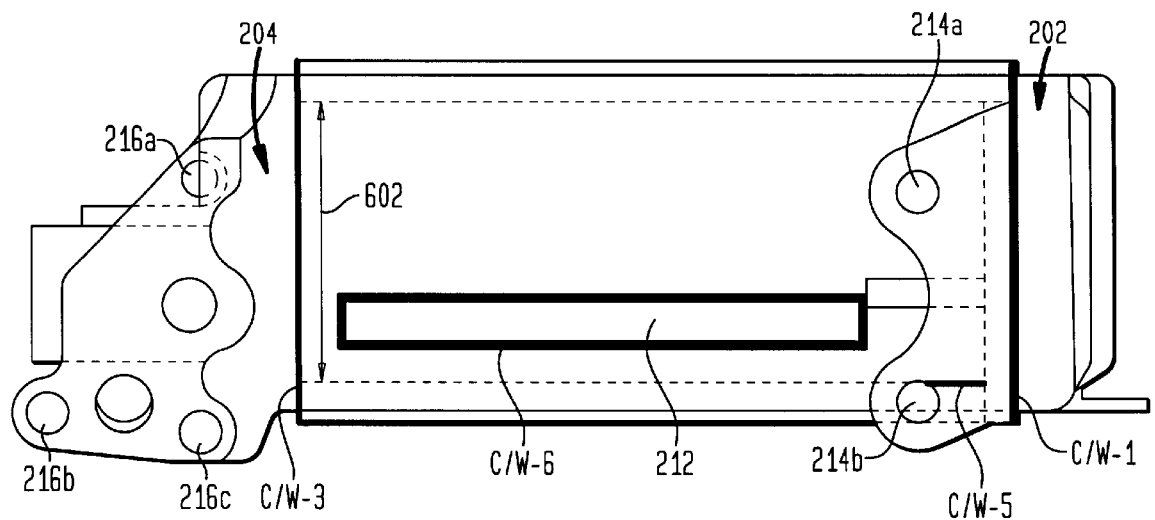
FIG. 6: Planar view of a top of an aviation oil cooler.
Figure 7:
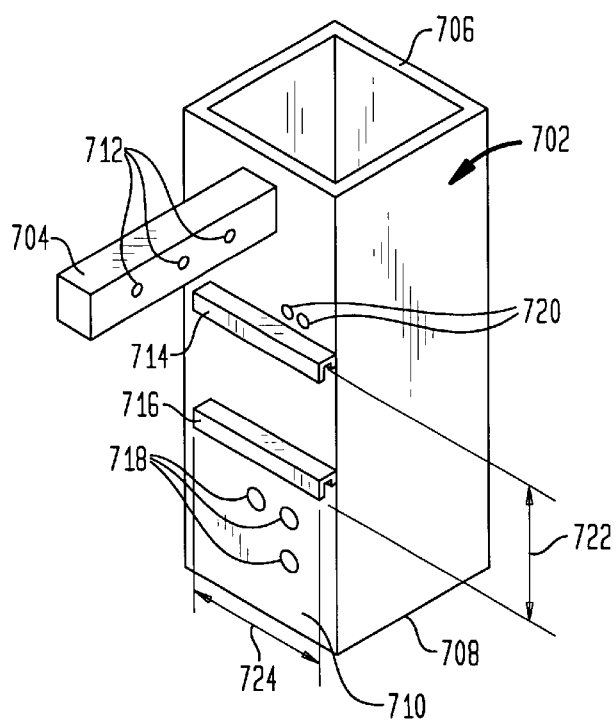
FIG. 7: Perspective view of a reassembly jig.
Figure 8:
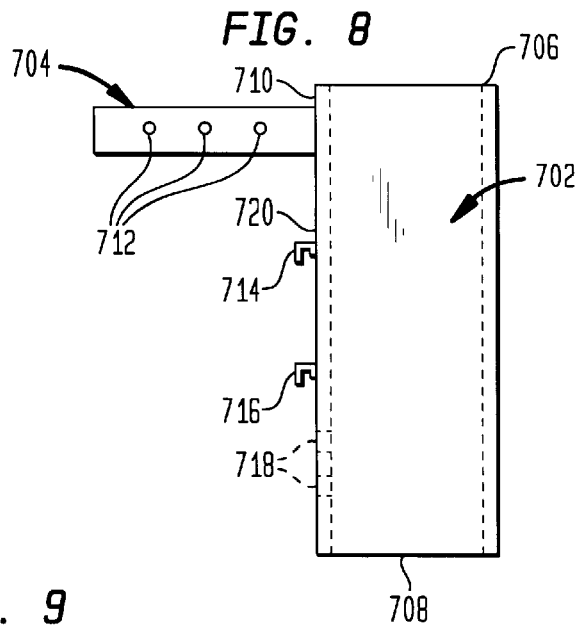
FIG. 8: Planar side view of the reassembly jig of the present invention.
Figure 9:
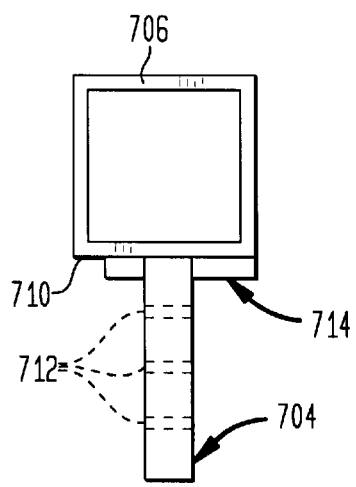
FIG. 9: Planar top view of the reassembly jig.
Figure 10:
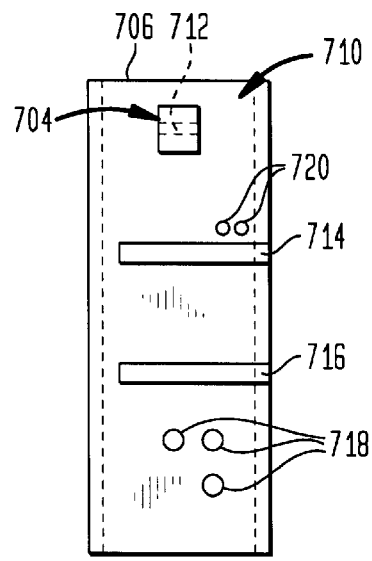
FIG. 10: Planar front view of the reassembly jig.

When the second inspection of the aviation oil cooler 200 is complete, processing continues to step 114 for the reassembly of the aviation oil cooler 200 with a new replacement core 206'. (For convenience, FIG. 2 shows an aviation oil cooler 200 that may incorporate either an original damage core 206 or a new replacement core 206'.) The new replacement core 206' and the OEM tanks (first tank 202 and second tank 204), brackets, valve bodies and oil ports are fitted to a reassemble jig of the present invention. A reassembly jig 700 of the present invention is a structure used to hold the components of an aviation oil cooler 200 in proper position and alignment with each other during reassembly of those components to ensure that the completed aviation oil cooler 200 maintains the OEM specifications. The reassembly jig 700 is discussed in greater detail below.

During the reassembly of the aviation oil cooler 200, a preliminary measurement of the aviation oil cooler 200 is made to verify the dimensions of the aviation oil cooler 200 against the OEM specifications for that type of aviation oil cooler. Adjustments are made to the reassembly jig 700 as needed to maintain OEM tolerance measurements. Then, the new replacement core 206' and the reusable parts (e.g., first tank 202 and second tank 204) are welded together along the OEM weld lines as shown in FIGS. 2–6 by the thick lines, C/W-1 to C/W-6. Welding is well known in the prior art. In the preferred embodiment, all welding is done using GTAW w/a 4043 filler rod. Also in the preferred embodiment, the welding of the reassembly of the aviation oil cooler 200 is performed according to well known techniques without regard to a specific order. It would be readily apparent to one of ordinary skill in the relevant art to weld the aviation oil cooler 200 according to the present invention.

After the reassembly of the aviation oil cooler 200 with a new replacement core 206', the aviation oil cooler 200 is removed from the reassembly jig 700 and processing continues to step 116 wherein the aviation oil cooler 200 is pressure tested to verify that it meets the OEM specifications for pounds of pressure per square inch (PSI), temperature, and duration according to the type of aviation oil cooler 200. Pressure testing an aviation oil cooler 200 is well known in the relevant art and it would be readily apparent to one of ordinary skill to perform a pressure test of the present invention to fully test the aviation oil cooler 200 as needed to ensure its certification. In the preferred embodiment, the pressure testing uses filtered compressed air, e.g. nitrogen, or cylinder air.

When the aviation oil cooler 200 successfully completes the pressure testing, processing continues to step 118 in which the aviation oil cooler 200 receives a final inspection. The aviation oil cooler 200 is measured to verify the appropriate OEM tolerances for the specific type of aviation oil cooler 200. Specifically, the following measurements are verified: the bolt hole positions, oil port alignment, and valve body placement. Conventional measurement devices are used to verify these measurements down to the 1/100 or 1/1000 decimal place as required. It would be readily apparent for one of ordinary skill in the relevant art to measure the aviation oil cooler 200 to verify such tolerances. In the preferred embodiment, conventional measurement devices are used. Further although this step in the recoring process is useful for quality assurance purposes, it is not required.

Once the final inspection is complete, the aviation oil cooler 200 with the new replacement core 206' is certified that it meets the specifications of the OEM and processing continues to step 120. In step 120, the aviation oil cooler 200 is inspected for quality fit and finish. The aviation oil cooler 200 is then placed in a plastic bag and packaged for shipment back to the originating customer.

B. Reassembly Jig

The reassembly jig 700 of the present invention is illustrated in FIGS. 7–10. The base support for the reassembly jig 700 is a support platform 702. In the preferred embodiment, the support platform 702 is a square hollow tube approximately 18"×7"×7", made of extruded steel approximately ¼" thick, having a top edge 706 and a bottom edge 708. The support platform 702 of the present invention is described in these terms and this shape for convenience purpose only. It would be readily apparent to one of ordinary skill in the relevant art to design and use a support platform 702 having a different, yet functionally equivalent shape, e.g., a rectangle.

A tank support bar 704 is a metal bar that extends from the top edge 706 of one face, called the front face 710, of there assembly jig 700. The tank support bar 704 has a plurality of tank support holes 712 by which a first tank 202 of a conventional aircraft oil cooler 200 can be mounted during reassembly with a new replacement core 206'. The tank support holes 712 are spaced apart at such a distance that the first tank side holes 210a–c of a first tank 202 of a commercially available aircraft oil cooler 200 can be mounted on the tank support bar 704.

In addition, the reassembly jig 700 has one or more first tank jig holes 720 that are also used in mounting the first tank 202. In the preferred embodiment, the first tank jig holes 720 are located on the front face 710 and are spaced apart at such a distance from each other that the first tank top holes 214a,b are aligned with them. Therefore, the first tank 202 is mounted to the reassembly jig 700 via the tank support holes 712 of the tank support bar 704 and the first tank jig holes 720. In the preferred embodiment, there are three tank support holes 712 in the tank support bar 704 and two first tank jig holes 720 to accommodate the three first tank side holes 210a–c and the first tank top holes 214a,b of the first tank 202 of a conventional Teledyne Continental, TSIO-520 engine oil cooler 200. The preferred embodiment is described in these terms for convenience purpose only. It would be readily apparent to one of ordinary skill to use a different number of tank support holes 712 and first tank jig holes 720 to accommodate a first tank 202 of a different type of aviation oil cooler 200

The reassembly jig 700 also comprises two core support bars 714, 716. In the preferred embodiment, the core support bars 714, 716 are metal bars mounted to the front face 710 of the reassembly jig 700 on which the tank support bar 704 is mounted. The length 724 of the core support bars 714, 716 is equal to the thickness 602 of the new replacement core 206' being mounted in the aircraft oil cooler 200. Further, the height of the core support bars 714, 716 is such that when a new replacement core 206' is placed on the core support bars 714, 716 wherein the edges 602 of the new replacement core 206' are aligned with the length 724 of the bars 714, 716, the new replacement core 206' is properly positioned within the first tank 202 and the second tank 204 such that the OEM specifications are maintained. The position of the two core support bars 714, 716, i.e., the distance from the top edge 706 that each core support bar 714, 716 is mounted to the front face 710 depends on the required position specifications of a core 206 or 206' within the first tank 202 and the seconds tank 204. It would be readily apparent to one of ordinary skill in the relevant art to manufacture a reassembly jig 700 as described herein for supporting a new replacement core 206' in the proper alignment in a commercially available oil cooler 200.

The reassembly jig 700 also comprise one or more second tank jig holes 718 for mounting the second tank 204 of a conventional aircraft oil cooler 200. The second tank jig holes 718 are spaced apart at such a distance that a second tank 204 of a commercially available aircraft oil cooler 200 can be mounted on the reassembly jig 700. Therefore, the second tank 204 is mounted to the reassembly jig 700 via the second tank jig holes 718. In the preferred embodiment, there are three second tank jig holes 718 made in a right triangle arrangement below the bottom core support bar 716 to accommodate the three second tank top holes 216a–c of the second tank 204 of a conventional Teledyne Continental, TSIO-520 engine oil cooler 200. The preferred embodiment is described in these terms for convenience purpose only. It would be readily apparent to one of ordinary skill to use a different number of second tank jig holes 718 and in a different configuration to accommodate a second tank 204 of a different type of aviation oil cooler 200.

In operation, the reassembly jig 700 is placed on its back side such that the front face 710 having the tank support bar 704 pointing up vertically and the core support bars 714, 716 being on top. See FIG. 11. A first tank 202 of an aircraft oil cooler 200, with the old core 206 removed, is mounted on the tank support bar 704 of the reassembly jig 700 via the tank support holes 712 in the tank support bar 704 and the first tank jig holes 720. Specifically, the first tank side holes 210a–c are bolted to the tank support holes 712 and the first tank top holes 214a,b are bolted to the first tank jig holes 720, thereby securing the first tank 202 to the reassembly jig 700.

A second tank 204 of the aircraft oil cooler 200 is mounted on the reassembly jig 700 via the second tank jig holes 718. Specifically, the second tank top holes 216a–c are bolted to the second tank jig holes 718, thereby securing the second tank 204 to the reassembly jig 700.

Figure 11:
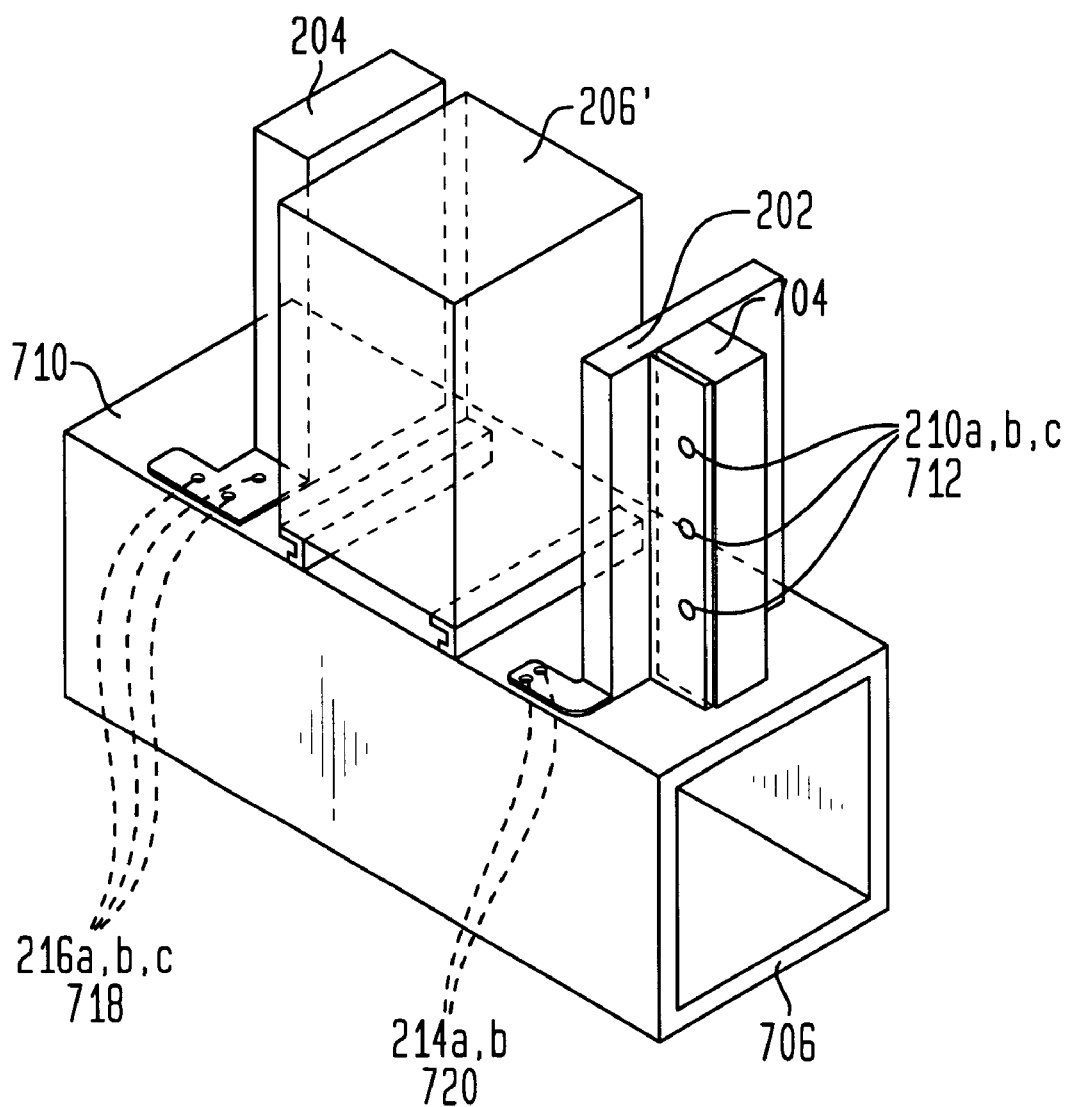
FIG. 11: A perspective view of the reassembly jig having a first tank, second tank and a new replacement core mounted thereon.

A new aircraft oil cooler replacement core 206' is slid in-between the first tank 202 and the second tank 204 secured to the reassembly jig 700 and placed on top of the core support bars 714, 716 such that the thickness 602 of the new replacement core 206' is flush with the edges of the length 724 of the core support bars 714, 716. The core support bars 714, 716 are of such a height and thickness that they support a new replacement core 206' in the proper position within the first tank 202 and the second tank 204 of an aircraft oil cooler 200 that maintains compliance with the manufacturer's engineering specifications associated with the aviation oil cooler 200. FIG. 11 shows a reassembly jig 700 of the present invention with a first tank 202, second tank 204 and a new replacement core 206' mounted thereon. Once the new replacement core 206' is properly positioned on the core support bars 714, 716, the new replacement core 206' is mounted to the aircraft oil cooler 200 by conventional means. Once properly mounted, the first tank 202, second tank 204 and new replacement core 206' of the aircraft oil cooler 200 are welded back together, along lines C/WC-1 to C/W-6, resulting in a re-manufactured aircraft oil cooler 200.

All references to materials, dimensions, and hole configurations have been to a conventional Teledyne Continental, TSIO-520 engine oil cooler 200 and are for convenience purpose only. It would be readily apparent for one of ordinary skill in the art to design and manufacture a reassembly jig 700 according to the present invention using comparable materials, different dimensions, and/or different hole and core support bar configurations to accommodate any aviation oil cooler, as long as the resulting reassembly jig 700 is of such a size and material that a reassembled aviation oil cooler meets the OEM specifications.

Conclusion

While various embodiments of the present invention have been described, it should be understood that they have been presented by the way of example only, and not limitation. It will be understood by those skilled in the art that various changes in form and details may be made therein without departing from the spirit and scope of the invention. Thus, the breadth and scope of the present invention should not be limited by any of the above-described exemplary embodiments, but should be defined in accordance with the described terms and their equivalents.

What is claimed is:

1. A method for recoring an aviation oil cooler having a first tank, a second tank, and an original core, comprising the steps of:
   a. disassembling the aviation oil cooler to remove the first tank, the second tank, and the original core from the aviation oil cooler, thereby generating a disassembled aviation oil cooler; and
   b. reassembling the first tank and second tank of the disassembled aviation oil cooler with a new replacement core, thereby generating a reassembled aviation oil cooler.

2. A method for recoring an aviation oil cooler having a first tank, a second tank, and an original core, comprising the steps of:
   a. disassembling the aviation oil cooler to remove the first tank, the second tank, and the original core from the aviation cooler, thereby generating a disassembled aviation oil cooler; and
   b. reassembling the first tank and second tank of the disassembled aviation oil cooler with a new replacement core, thereby generating a reassembled aviation oil cooler, wherein said reassembling uses a reassembly jig and comprises the steps of:
      b.1 mounting the first tank to the reassembly jig;
      b.2 mounting the second tank to the reassembly jig;
      b.3 positioning the new replacement core in-between the first tank and the second tank on the reassembly jig; and
      b.4 rigidly securing the first tank, the second tank and the new replacement core, thereby creating the reassembled aviation oil cooler.

3. The method for recoring according to claim 1, further comprising the step of:
   c. pre-cleaning the aviation oil cooler; wherein said step c occurs prior to said step a.

4. The method for recoring according to claim 3, further comprising the step of:
   d. performing an initial inspection of the aviation oil cooler; wherein said step d occurs before said step b.

5. The method for recoring according to claim 1, further comprising the step of:
   c. pressure testing the reassembled aviation oil cooler; wherein said step c occurs after said step b.

6. The method for recoring according to claim 5, further comprising the step of:
   d. performing a final inspection of the reassembled aviation oil cooler to ensure correct tolerances; wherein said step d occurs after said step c.

7. The method for recoring according to claim 1, further comprising the step of:
   c. performing an intermediate inspection of the aviation oil cooler; wherein said step c occurs after said step a and before said step b.

8. The method for recoring according to claim 1, further comprising the step of:
   c. receiving the aviation oil cooler from an aviation oil cooler customer; wherein said step c occurs prior to said step a.

9. The method for recoring according to claim 2, further comprising the step of:
   c. pre-cleaning the aviation oil cooler; wherein said step c occurs prior to said step a.

10. The method for recoring according to claim 9, further comprising the step of:
    d. performing an initial inspection of the aviation oil cooler; wherein said step d occurs before said step b.

11. The method for recoring according to claim 2, further comprising the step of:
    c. pressure testing the reassembled aviation oil cooler; wherein said step c occurs after said step b.

12. The method for recoring according to claim 11, further comprising the step of:
    d. performing a final inspection of the reassembled aviation oil cooler to ensure correct tolerances; wherein said step d occurs after said step c.

13. The method for recoring according to claim 2, further comprising the step of:
    c. performing an intermediate inspection of the aviation oil cooler; wherein said step c occurs after said step a and before said step b.

14. The method for recoring according to claim 2, further comprising the step of:

c. receiving the aviation oil cooler from an aviation oil cooler customer; wherein said step c occurs prior to said step a.

15. The method for recoring according to claim 2 wherein said reassembling is completed by welding said new replacement core, said first tank, and said second tank together.

16. The method for recoring according to claim 1, wherein said reassembling is completed by welding said new replacement core, said first tank, and said second tank together.

* * * * *